(12) United States Patent
Desserrey et al.

(10) Patent No.: US 11,517,826 B2
(45) Date of Patent: Dec. 6, 2022

(54) GAME RESULT OVERLAY SYSTEM

(71) Applicant: Snap Inc., Santa Monica, CA (US)

(72) Inventors: Laurent Desserrey, Los Angeles, CA (US); Dylan Shane Eirinberg, Venice, CA (US); Matthew Colin Grantham, Toronto (CA); Patrick Mandia, Venice, CA (US); David Whyte, Toronto (CA); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/897,807

(22) Filed: Jun. 10, 2020

(65) Prior Publication Data
US 2021/0387099 A1    Dec. 16, 2021

(51) Int. Cl.
| A63F 13/87 | (2014.01) |
|---|---|
| A63F 13/46 | (2014.01) |
| A63F 13/49 | (2014.01) |
| A63F 13/48 | (2014.01) |
| G06T 11/00 | (2006.01) |

(Continued)

(52) U.S. Cl.
CPC .............. *A63F 13/87* (2014.09); *A63F 13/46* (2014.09); *A63F 13/48* (2014.09); *A63F 13/49* (2014.09); *G06T 11/00* (2013.01); *A63F 2300/408* (2013.01); *A63F 2300/61* (2013.01); *A63F 2300/636* (2013.01); *G06F 3/04817* (2013.01); *G06F 3/04842* (2013.01)

(58) Field of Classification Search
CPC .......... A63F 13/46; A63F 13/48; A63F 13/49; A63F 13/87; A63F 13/497; A63F 2300/61; A63F 2300/634; A63F 2300/636
See application file for complete search history.

(56) References Cited

U.S. PATENT DOCUMENTS

| 4,342,454 A | * | 8/1982 | Baer | ........................ | A63F 13/10 |
|---|---|---|---|---|---|
| | | | | | 463/31 |
| 6,231,443 B1 | * | 5/2001 | Asai | ..................... | A63F 13/5252 |
| | | | | | 463/32 |

(Continued)

FOREIGN PATENT DOCUMENTS

| KR | 20120018703 A | 3/2012 |
|---|---|---|
| WO | WO-2021252233 A1 | 12/2021 |

OTHER PUBLICATIONS

"International Application Serial No. PCT/US2021/035372, International Search Report dated Sep. 17, 2021", 3 pgs.

(Continued)

*Primary Examiner* — Steven J Hylinski
(74) *Attorney, Agent, or Firm* — Schwegman Lundberg & Woessner, P.A.

(57) ABSTRACT

Systems and methods are directed to presenting, by one or more processors, a game result indicium and in response to a user-selection of the game result indicium, the system and method retrieves game play information related to a game play session. The system also generates, by the one or more processors, a game result overlay based on the game play information generated during the game play session, presents the game play overlay overlaid on a media content item to generate a composite media content item, and transmits the composite media item to a second user.

20 Claims, 13 Drawing Sheets

(51) Int. Cl.
*G06F 3/04842* (2022.01)
*G06F 3/04817* (2022.01)

(56) References Cited

U.S. PATENT DOCUMENTS

| | | | |
|---|---|---|---|
| 6,699,127 B1* | 3/2004 | Lobb | A63F 13/10 463/43 |
| 7,717,789 B2* | 5/2010 | Shimizu | A63F 13/10 463/31 |
| 7,798,905 B2* | 9/2010 | Thompson | A63F 13/798 463/40 |
| 8,038,535 B2* | 10/2011 | Jensen | G07F 17/32 463/42 |
| 9,244,924 B2* | 1/2016 | Cheng | G06F 16/43 |
| 9,278,288 B2* | 3/2016 | McCarthy | H04N 21/8549 |
| 9,364,743 B2* | 6/2016 | Miura | A63F 13/497 |
| 9,682,313 B2* | 6/2017 | Wilkiewicz | A63F 13/60 |
| 9,884,258 B2* | 2/2018 | Huang | A63F 13/212 |
| 10,095,390 B1* | 10/2018 | Lewis | G06F 3/0482 |
| 10,110,651 B2* | 10/2018 | Selekman | H04L 67/306 |
| 10,252,172 B2* | 4/2019 | Hayashida | A63F 13/497 |
| 10,398,975 B2* | 9/2019 | Hayashida | A63F 13/497 |
| 10,523,606 B2* | 12/2019 | Kozhemiak | H04L 51/10 |
| 10,838,599 B2* | 11/2020 | Barkman | H04N 21/64322 |
| 10,898,815 B1* | 1/2021 | Jia | H04N 21/2668 |
| 10,938,758 B2* | 3/2021 | Allen | G06F 3/0484 |
| 2002/0123380 A1* | 9/2002 | Hirai | A63F 13/10 463/31 |
| 2004/0198485 A1 | 10/2004 | Loose et al. | |
| 2004/0224741 A1* | 11/2004 | Jen | A63F 13/46 463/6 |
| 2004/0225386 A1* | 11/2004 | Thompson | A63F 13/12 700/92 |
| 2007/0060389 A1* | 3/2007 | Shimizu | A63F 13/497 463/43 |
| 2008/0119286 A1* | 5/2008 | Brunstetter | A63F 13/73 463/43 |
| 2008/0139301 A1* | 6/2008 | Holthe | A63F 13/335 463/25 |
| 2008/0167121 A1 | 7/2008 | Maeda et al. | |
| 2009/0082101 A1* | 3/2009 | Ostergren | A63F 13/79 463/31 |
| 2009/0131177 A1* | 5/2009 | Pearce | A63F 13/12 463/43 |
| 2009/0176557 A1* | 7/2009 | Hall | A63F 13/85 463/25 |
| 2009/0233713 A1* | 9/2009 | Tamura | A63F 13/67 463/36 |
| 2009/0312097 A1* | 12/2009 | Iwakiri | A63F 13/812 463/31 |
| 2010/0217802 A1* | 8/2010 | Rubio Andres | G06Q 10/10 709/204 |
| 2010/0260487 A1* | 10/2010 | Zbeda | A63F 13/497 386/239 |
| 2011/0151971 A1* | 6/2011 | Altshuler | A63F 13/497 463/30 |
| 2011/0312424 A1* | 12/2011 | Burckart | H04N 21/4788 463/42 |
| 2013/0084969 A1* | 4/2013 | Knoles | A63F 13/795 463/29 |
| 2013/0129307 A1* | 5/2013 | Choe | G06F 16/738 386/227 |
| 2013/0260896 A1* | 10/2013 | Miura | A63F 13/795 463/42 |
| 2014/0155171 A1* | 6/2014 | Laakkonen | A63F 13/12 463/42 |
| 2014/0155174 A1* | 6/2014 | Laakkonen | A63F 13/12 463/42 |
| 2014/0156037 A1* | 6/2014 | Laakkonen | A63F 13/46 700/91 |
| 2014/0179424 A1* | 6/2014 | Perry | A63F 13/355 463/31 |
| 2014/0179439 A1* | 6/2014 | Miura | A63F 13/2145 463/42 |
| 2014/0187318 A1* | 7/2014 | Gallizzi | A63F 13/355 463/31 |
| 2014/0228112 A1* | 8/2014 | Laakkonen | A63F 13/497 463/31 |
| 2015/0141140 A1* | 5/2015 | Lampe | G11B 27/031 463/31 |
| 2015/0170459 A1 | 6/2015 | Walker et al. | |
| 2015/0224409 A1* | 8/2015 | Hayashida | A63F 13/87 463/31 |
| 2017/0014722 A1 | 1/2017 | Rimon | |
| 2017/0228600 A1* | 8/2017 | Syed | G06V 20/62 |
| 2018/0001194 A1* | 1/2018 | Sherwani | A63F 13/79 |
| 2020/0147499 A1* | 5/2020 | Mahlmeister | H04L 67/38 |
| 2020/0147501 A1* | 5/2020 | Mahlmeister | A63F 13/798 |
| 2020/0410241 A1* | 12/2020 | Sundareson | G06V 20/47 |

OTHER PUBLICATIONS

"International Application Serial No. PCT/US2021/035372, Written Opinion dated Sep. 17, 2021", 4 pgs.

* cited by examiner

GAME RESULT OVERLAY SYSTEM

BACKGROUND

Social media sharing platforms allow users to share millions of messages between mobile devices within a social network environment. Users the social network can share media content, such as audio, images, and video between their perspective user devices (e.g., mobile devices, personal computers). The social media sharing platforms may further allow users to capture and share images and pictures with other users by exchanging text messages.

As the popularity of mobile-based social networking systems continues to grow, users are increasingly sharing media content items, such as images, pictures, and video with each other. These media content items encourage electronic visual communication on a global scale and promote ease of use in interactive socialization.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
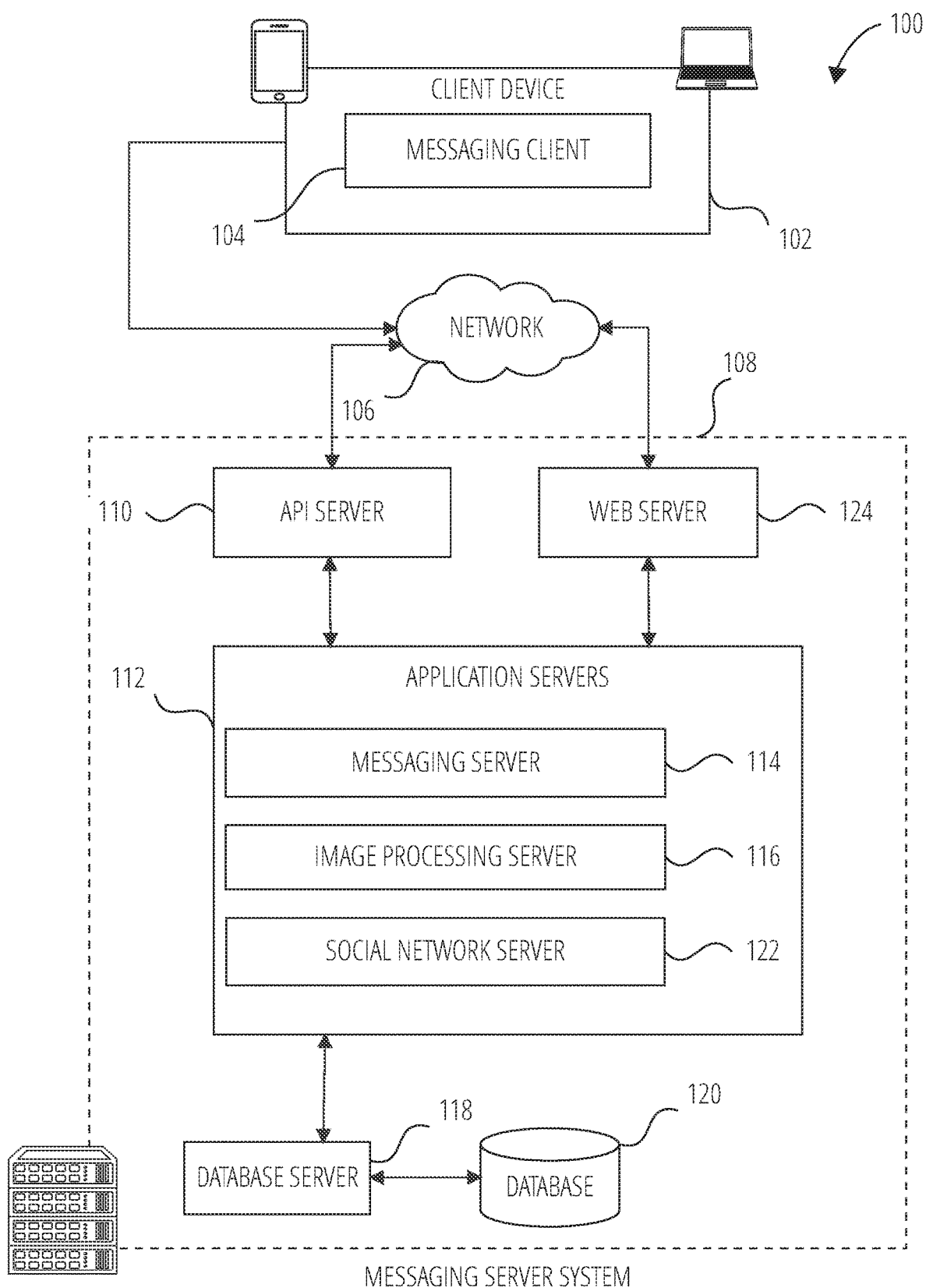
FIG. 1 is a diagrammatic representation of a networked environment in which the present disclosure may be deployed, in accordance with some examples.

Social networking systems have become more advanced and sophisticated. For instance, users can now launch gaming applications and other forms of media applications directly from their mobile device while active in the social networking application, such as a messaging application.

However, due to the lack of computing logic in current social media network-based systems, it is increasingly difficult to create and share gaming elements, such as gaming results, gaming, and media profile information, and other gaming and media information with connected users in the social network during a chat session or while active in the social networking application.

In at least one example of the present disclosure, a system is provided that generates a game result overlay created from a compilation of captured gaming objects and elements within the game in order to share the component with other users in the social networking application. When a user launches a gaming application while logged into a messaging application, the user is directed to the gaming site in order to play the game.

Once the user of the device has finished playing the game, different characters, avatars, icons, gaming results, and buttons appear in the two-dimensional (or three-dimensional) environment of the game. The system of the present disclosure identifies certain graphical objects and elements in the game environment and combines the identified elements in order to generate the gaming overlay component.

For instance, gaming applications have many graphical objects and graphical elements rendered in the foreground, background, and overall gaming environment. These objects and elements include player characters, buildings, structures, graphical icons, player avatars, gaming results, and the like. The system identifies relevant graphical objects and elements that communicate and provide the most concise information related to the user's gaming experience, such as the user's avatar, the user's gaming results, the user's score, and the user gaming title.

The game result overlay can be shared with other users in the social network during creation of a content collection using media content items (e.g., digital photographs or videos). The game result overlay is overlaid on top of the media content item, thus, creating a content collection containing the game result overlay that is shared to other users via a chat messaging feature. When other intended users receive the content collection containing the overlaid gaming overlay component, the recipient users are able to visualize and confirm the sending user's gaming experience.

In another example of the present disclosure, users access previous gaming applications as they launch a chat interface by generating a game result overlay thumbnail and overlaying the thumbnail above, or beneath, a chat messaging field in a chat interface. Once the user applies a user gesture on the thumbnail, such as pressing the thumbnail with their finger, the user is immediately taken to the associated gaming application depicted by the thumbnail.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114 or from a gaming or media application.

Figure 3:
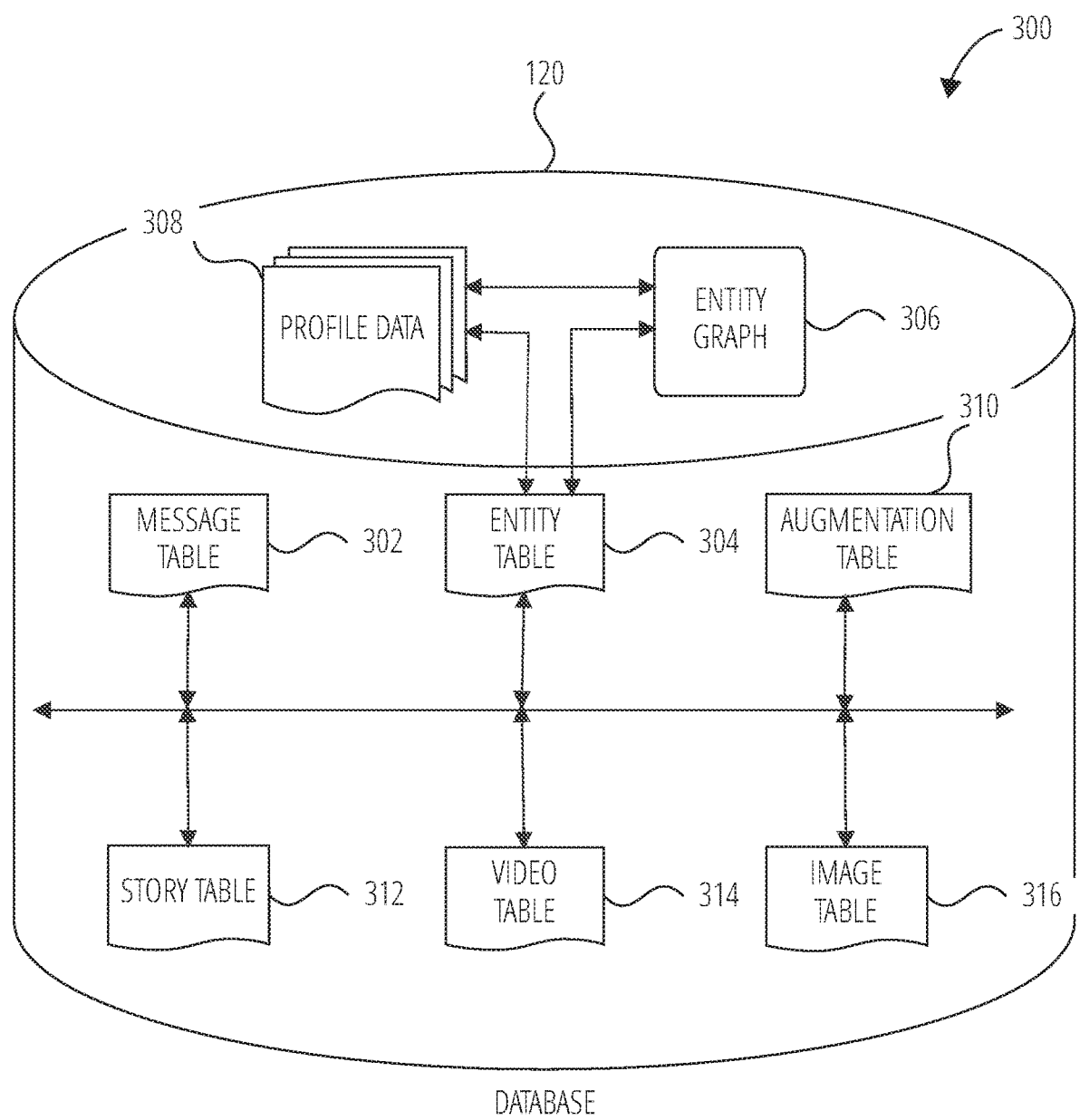
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
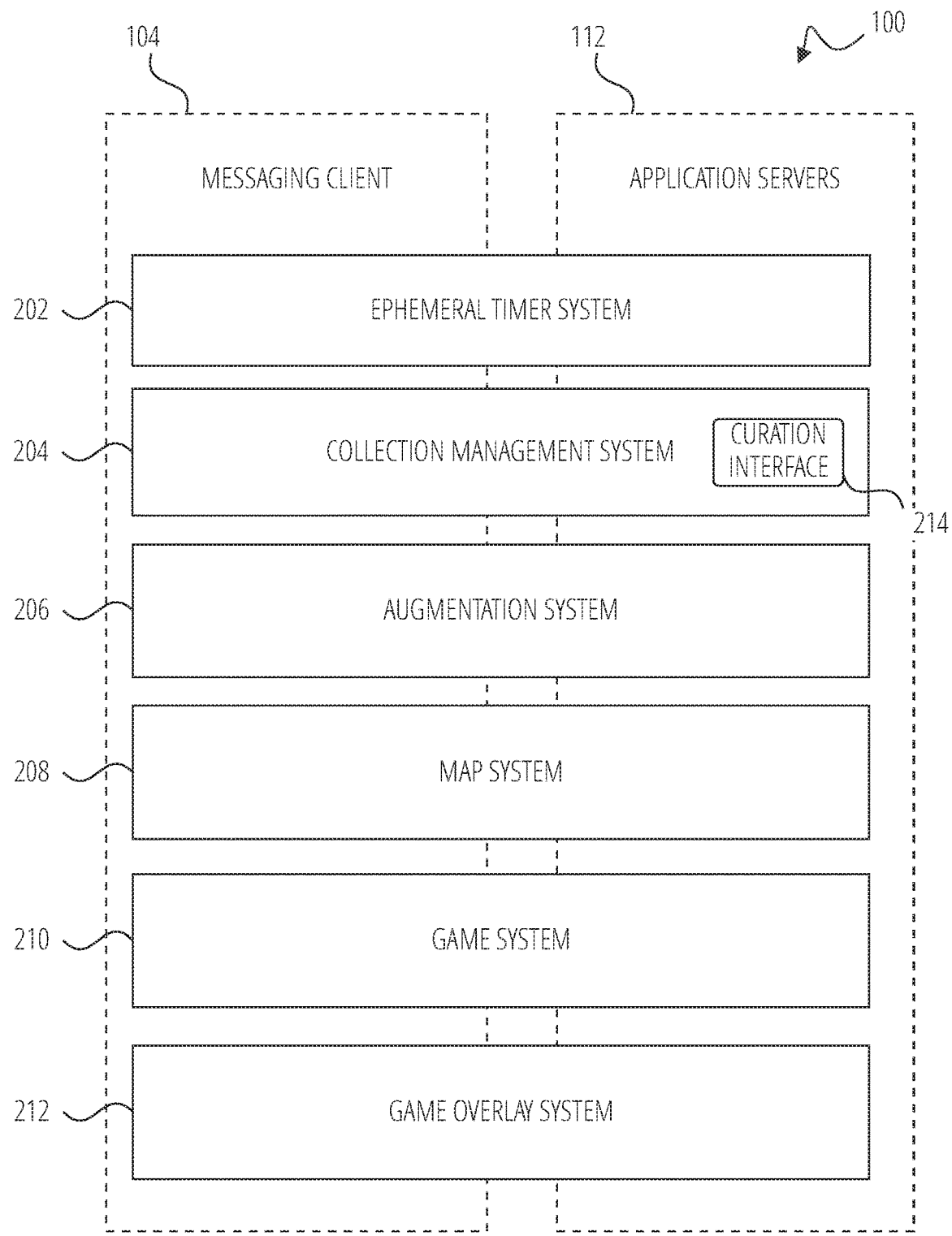
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210, and a game result overlay system 212.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 214 that allows a collection manager to manage and curate a particular collection of content. For example, the curation interface 214 enables an event organizer to curate a collection of content relating to a specific event (e.g., delete inappropriate content or redundant messages).

Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The game result overlay system 212 provides various operations, routines, and functions within the context of the messaging client 104 and the application servers 112. The operations of the game result overlay system 212 are executed at the messaging client 104, the client device 102, the application servers 112, or a third-party server and include presenting, by one or more processors, a game result indicium.

In some examples, the game result overlay system 212 can be in communication with the game system 210 in order to launch the various gaming applications and functions provided by the game interface. The operations executed by the game result overlay system 212 also include responsive to a user-selection of the game result indicium, retrieving game play information related to a game play session. The game result overlay system 212 utilizes image processing functions, such as image processing functions and routines executed by the image processing server 116, when retrieving game play information rendered in the gaming environment.

In some examples, game play information includes, but are not limited to, player characters, player results, player statistics, buildings, structures, graphical icons, player avatars, overall gaming results, title icons, avatars representing one or more users of the messaging client 104, avatars representing one or more users of the messaging client 104, two-dimensional and three-dimensional objects, animation associated with a gaming preferences of the gaming application, usernames of one or more users of the messaging client 104, and gaming results associated with one or more users.

The game result overlay system 212 generates, by the one or more processors, a game result overlay based on game play information generated during the game play session. In some examples, multiple users in the network 106 can be receive the game result overlay. Operations of the game result overlay system 212 further include presenting the game play overlay overlaid on a media content item to generate a composite media content item and transmitting the composite media item to a second user.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316). In some examples, augmentation data within the augmentation table 310 may be overlays or image component overlays in the form of augmented reality images, segments, graphical objects, graphical elements, avatars, filters, 2D or 3D alphanumeric characters, 2D or 3D animation, or icons that are captured from a virtual environment, gaming environment, one or more media content item, or from a the entity table 304 in database 120. Additionally, the augmentation data may include an animation, a three-dimensional object, a media content overlay, an avatar, or an image that is overlaid or superimposed over received media content items.

Filters, in some examples, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
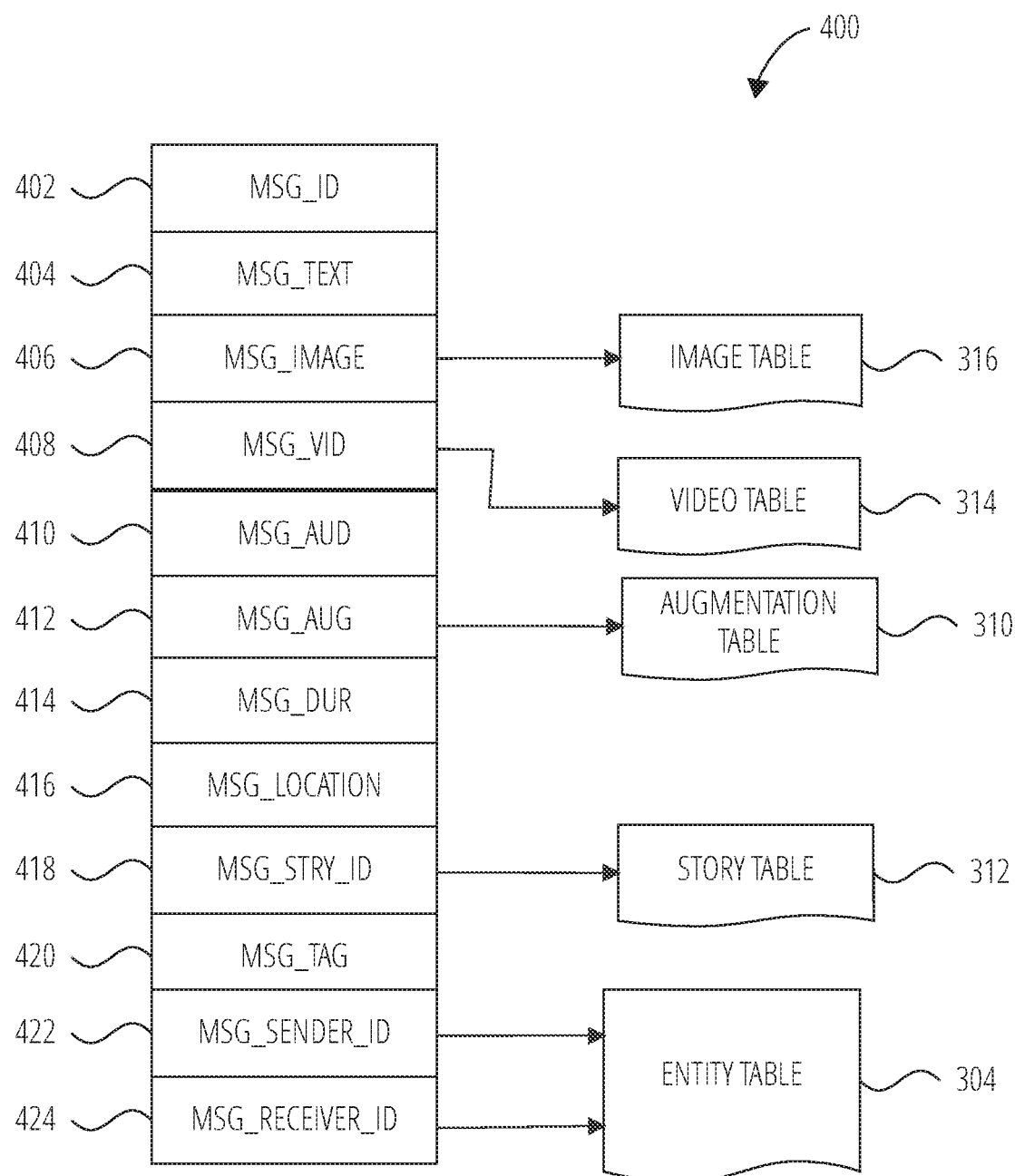
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
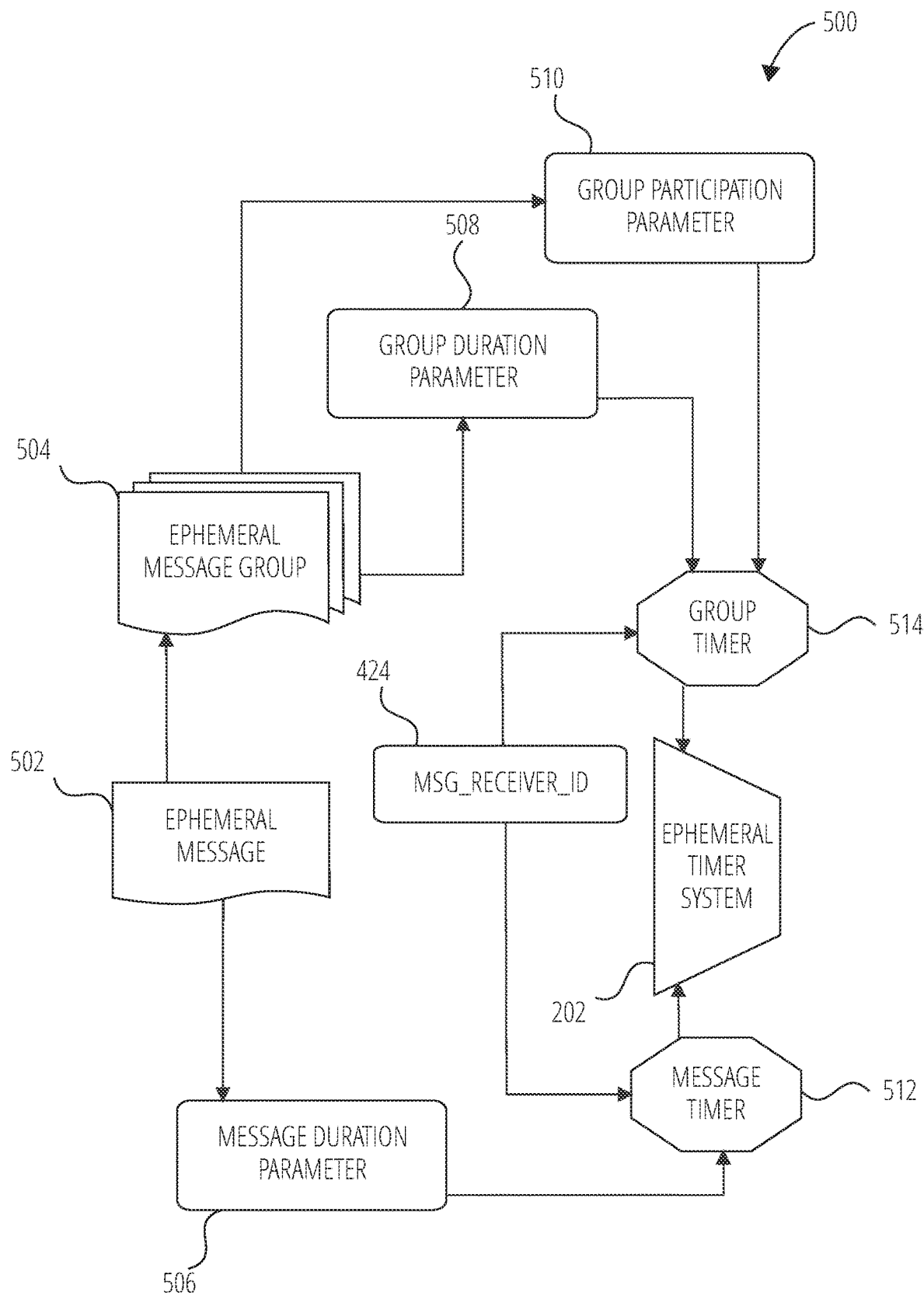
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In some examples, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In some examples, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
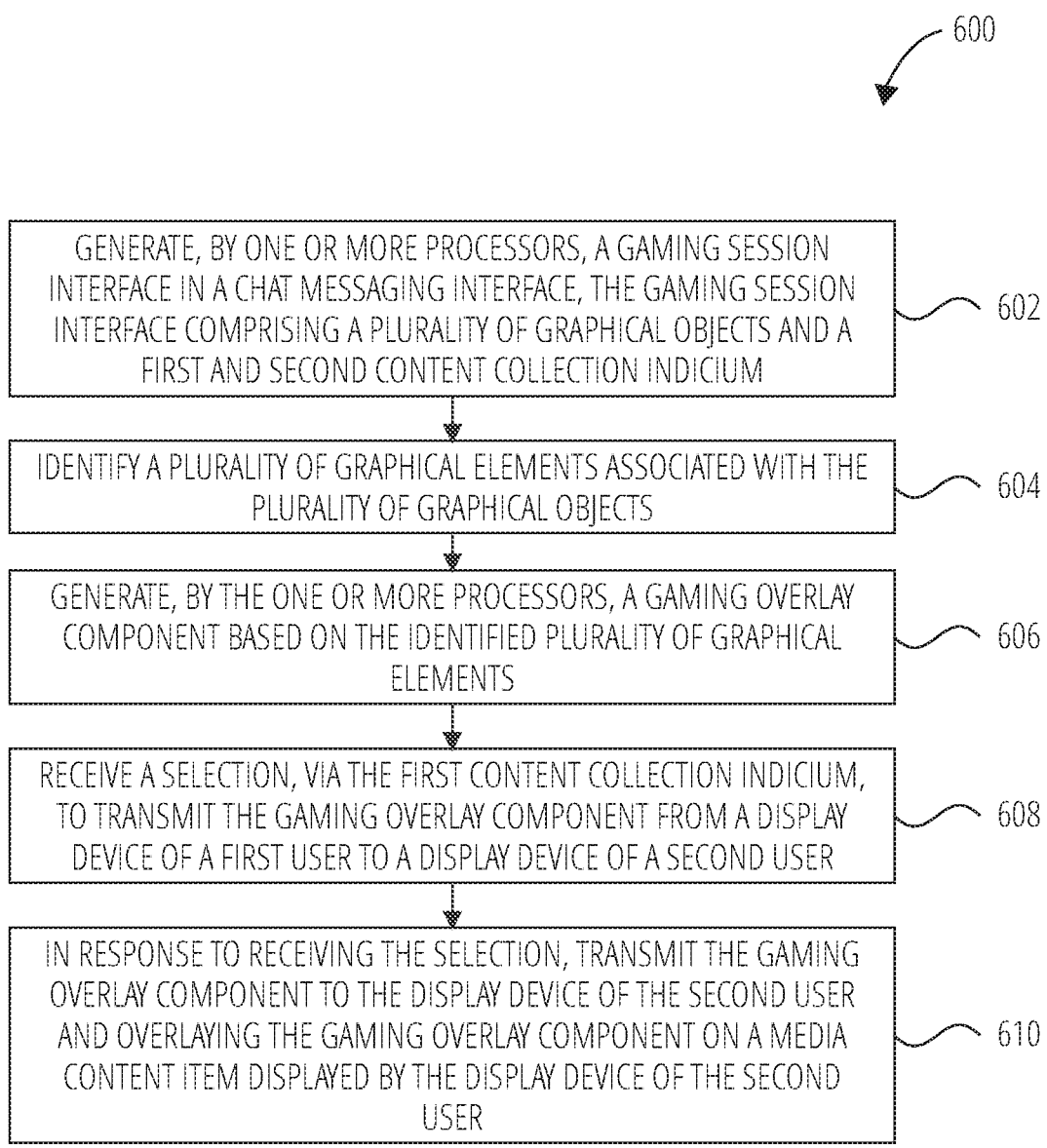
FIG. 6 is a user interface diagram illustrating an example user interface of a gaming application in accordance with some examples.

FIG. 6 is a user interface diagram illustrating an example user interface of a gaming application in accordance with some examples. The user interface 600, also referred to as the gaming interface 700, depicts a gaming application with a variety of game play information. In some examples, game play information includes multiple graphical objects and graphical elements situated and presented in an arranged format in the game application environment.

For instance, the gaming interface 600 includes a gaming title graphical object 602, cloud graphical objects 704, a gaming result graphical element of the second user 606, a gaming result graphical element of the second user 606, an avatar graphical object of the first user 608, an avatar graphical object of the second user 610, a gaming results graphical element of the first user 612 and building structure graphical objects 620.

The gaming user interface 600 is not limited to the graphical objects and elements 604-612, as displayed in FIG. 6. In some examples, there are various types of game play information, including a variety of different graphical objects and elements that are rendered in the gaming interface, some of which depend on the type or category of gaming application.

As shown in FIG. 6, game play information, including the gaming title graphical object 602, illustrates the gaming application title listed as "CORY TV." The cloud graphical objects 604 and building structure graphical objects 620 are depicted in the background and foreground of the gaming interface 600. The avatar graphical object of the first user 608 and the avatar graphical object of the second user 610 illustrate the digital representation avatar of the users who are currently engaged in the gaming application.

For example, "RENE" is listed as the avatar graphical object of the first user 608 and "NIKOL" is listed as the avatar graphical object of the second user 610. In some examples, game play information, including individual or sets of gaming elements are incorporated into the graphical objects, as shown in FIG. 6. For example, gaming results graphical element of the first user 612 are illustrated as "797 tokens" and the gaming result graphical element of the second user 606 are illustrated as "783 tokens". The gaming results are graphical elements that are integrated into the image of the avatar graphical object of the first user 608 and avatar graphical object of the second user 610.

Still referring to FIG. 6, the gaming interface 600 illustrates a game result indicium 614, a game result launch indicia 616, and a chat messaging interface 618. The game result indicium 614 and the game result launch indicia 616 are interactive buttons, icons, or graphical control elements that enable the user of the computing device to activate or trigger a tasks or event, such as generating a game result overlay or starting a new gaming application. Although a gaming interface is disclosed, the present disclosure includes any media interface associated with a media application directed to customized business, utility, collaborative gaming, non-collaborative gaming, entertainment, social, file sharing, productivity, health, commerce, sports, or music.

As shown in FIG. 6, for illustration purposes, the gaming interface 600 includes the game result indicium 614 labeled "TAKE" that is activated (e.g., by user selection) to trigger an event, such as, generating a gaming overlay component or generating a game result overlay thumbnail component. The game result indicium 614 is enabled to exit the gaming application and game play session.

In some examples, the gaming interface 700 also includes the game result launch indicia 616, which labeled "NEXT GAME" and is activated (e.g., by user selection) to trigger an event, such as restarting the same gaming application or a different gaming application. Although a gaming application is disclosed, the present disclosure includes any media application associated with customized business, utility, collaborative gaming, non-collaborative gaming, entertainment, social, file sharing, productivity, health, commerce, sports, or music. The chat messaging interface 618 includes a variety of tools (e.g., text field, camera option, settings indicium, contact list indicium, and a microphone indicium) that enable a user or multiple users to communicate in a messaging session, also referred to as a chat session, or activate a gaming or media application.

Figure 7:
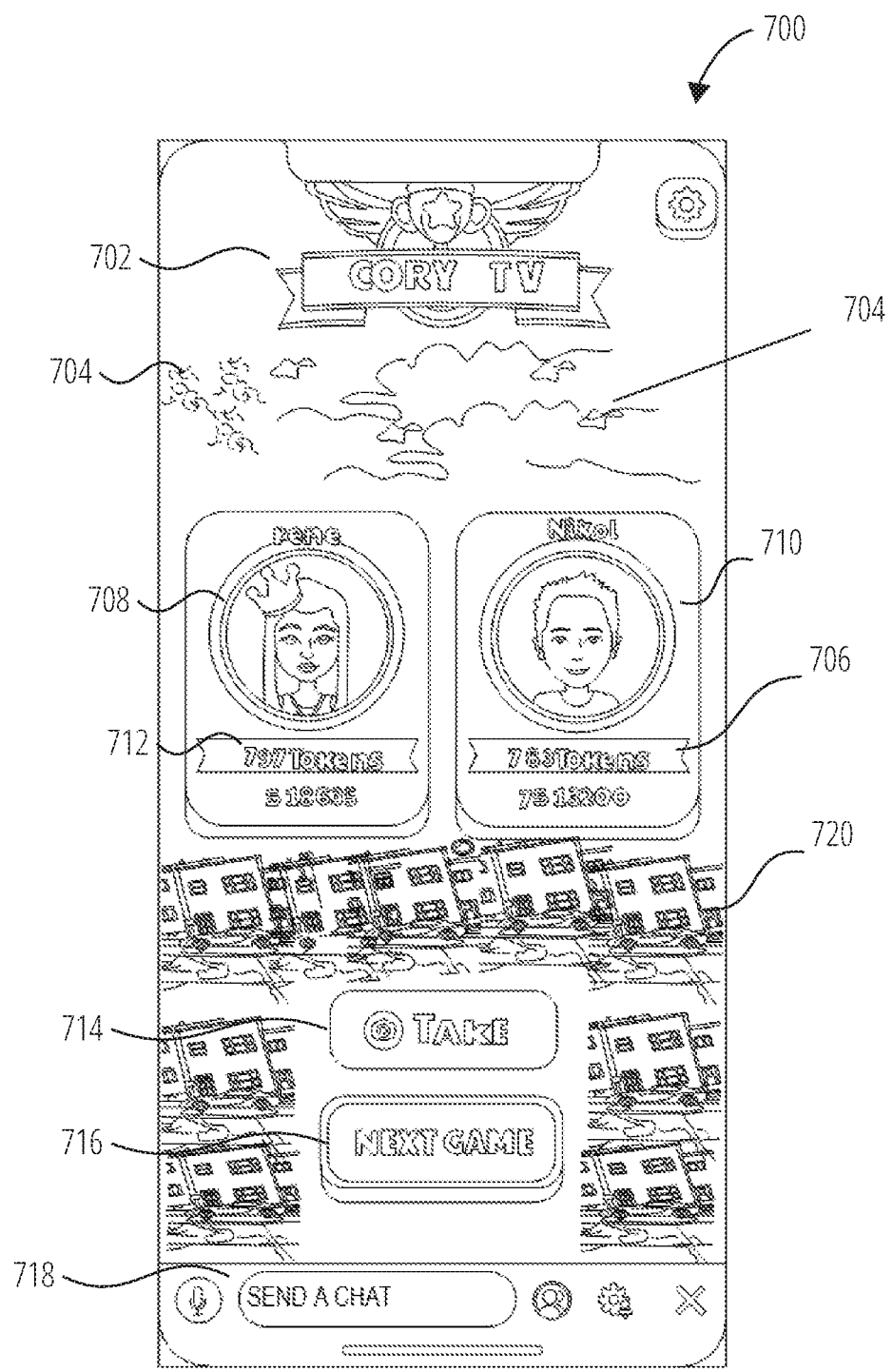
FIG. 7 is a user interface diagram illustrating an example user interface of a content collection creation interface in accordance with some examples.

FIG. 7 is a user interface diagram illustrating an example user interface of a content collection creation interface 800 in accordance with some examples. As shown in FIG. 7, a user of the client device 102 (e.g., the first user or the second user) selected the game result indicium 614, as illustrated in FIG. 6, which enables the system to create and share a content collection using media content items and a generated game result overlay 704. In other examples, the content collection creation interface 700 depicts an interface in which the user creates the content collection in order to share with another user over the social network using one or more media items captured by the client device 102 (e.g., integrated camera), stored in database 120, or received via third-party service or computing device.

The client device 102 (or a server-side computing device or third-party server) generates the game result overlay 704 by generating or retrieving game play information related to a game play session or by identifying game play information, which can include a set of graphical elements or objects, associated with the set of graphical objects shown in FIG. 7. In other examples, image processing, including optical identification scanning functions, is utilized in identifying and retrieving the set of graphical elements or objects by scanning the game play session and capturing the graphical elements that are embedded, formatted, displayed, or hidden within the gaming application gaming environment and the graphical object. In some examples, the game play information can be retrieved from local storage in the client device 102, the database 120 or game system 210 (e.g, which can straddle the client device 102 and the messaging server system 108).

As shown in FIG. 7, the game result overlay 704 is generated from the retrieved game play information, including, but not limited to, the gaming title graphical object 602, avatar graphical object of the first user 608, avatar graphical object of the second user 610, gaming results graphical element of the first user 612, and the gaming result graphical element of the second user 606. In some examples, a composite media content item is generated, which includes the media content item 702 and game result overlay 704, and displayed at the client device 102 prior to transmitting (e.g., sharing) with another user in the social network. In other examples, upon generating a content collection using a captured or stored media content item 702, (e.g., digital photograph), the game result overlay 704 is overlaid on top of the media content item 702 prior to transmitting (e.g., sharing) the content collection with another user in the social network (e.g., a second, third, or fourth user).

Figure 8:
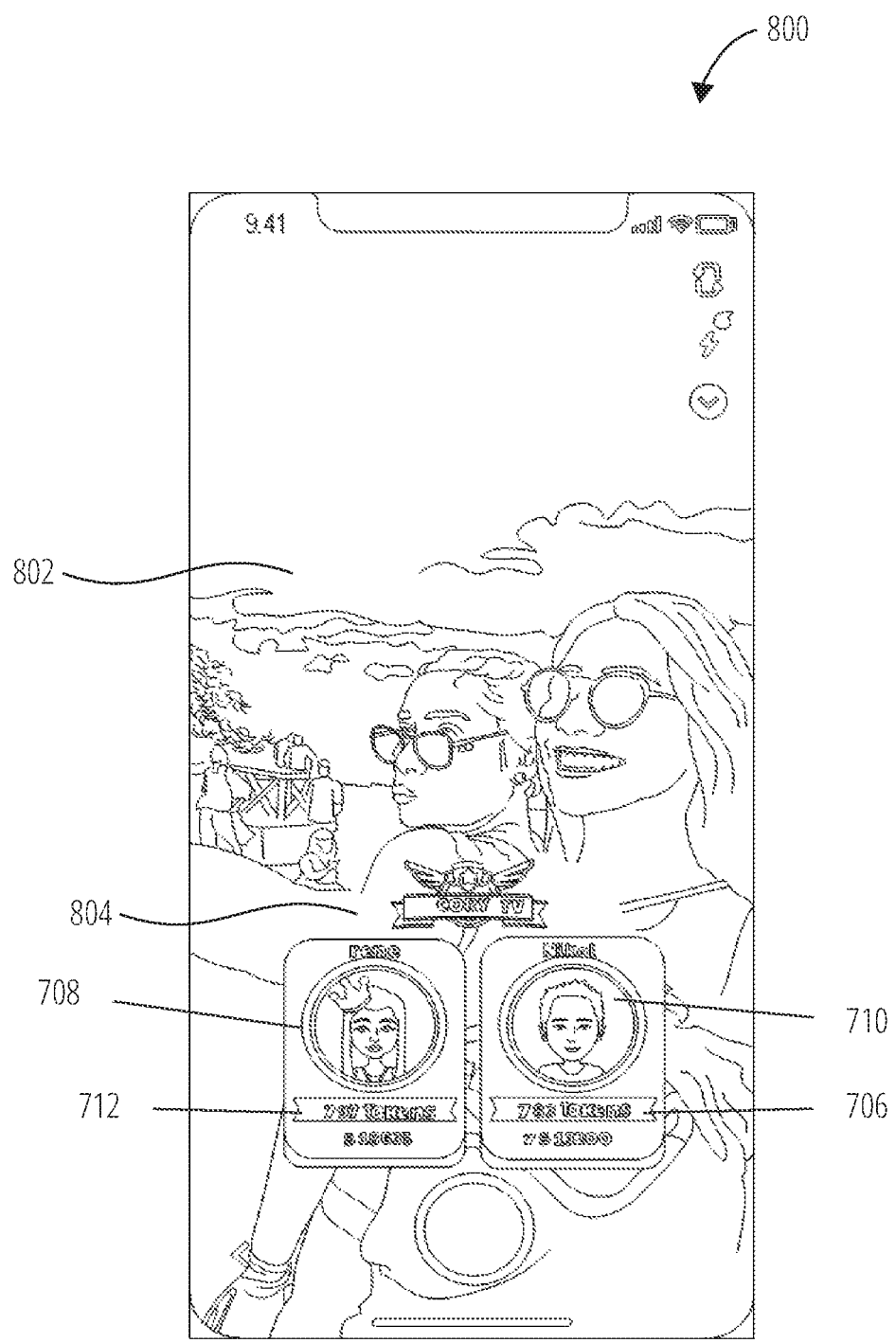
FIG. 8 is a user interface diagram illustrating an example user interface of the game result overlay overlaid on top of the content collection in accordance with some examples.

FIG. 8 is a user interface diagram illustrating an example user interface of the game result overlay 704 overlaid on top of the content collection in accordance with some examples. As illustrated in FIG. 8, the game result overlay 704 is overlaid on top of the media content item 702 as it is rendered and received by the receiving user profile 802, thus generating a composite media content item 804. In some examples, the composite media content item 804 is a single digital entity, such as a merged digital photograph content item.

A receiving client device 102 is associated with receiving user profile 802 labeled "BETH" that is stored in the entity table 304, database 120, or received via third-party server. In some examples, the chat messaging interface 618 enables the receiving user profile 802 to input a text string, which includes digital expression objects, emojis, avatars, letters, numbers, or special characters that are superimposed or overlaid on top of an ephemeral message, content collection, or ephemeral content collection as the user is viewing the content collection.

Figure 9:
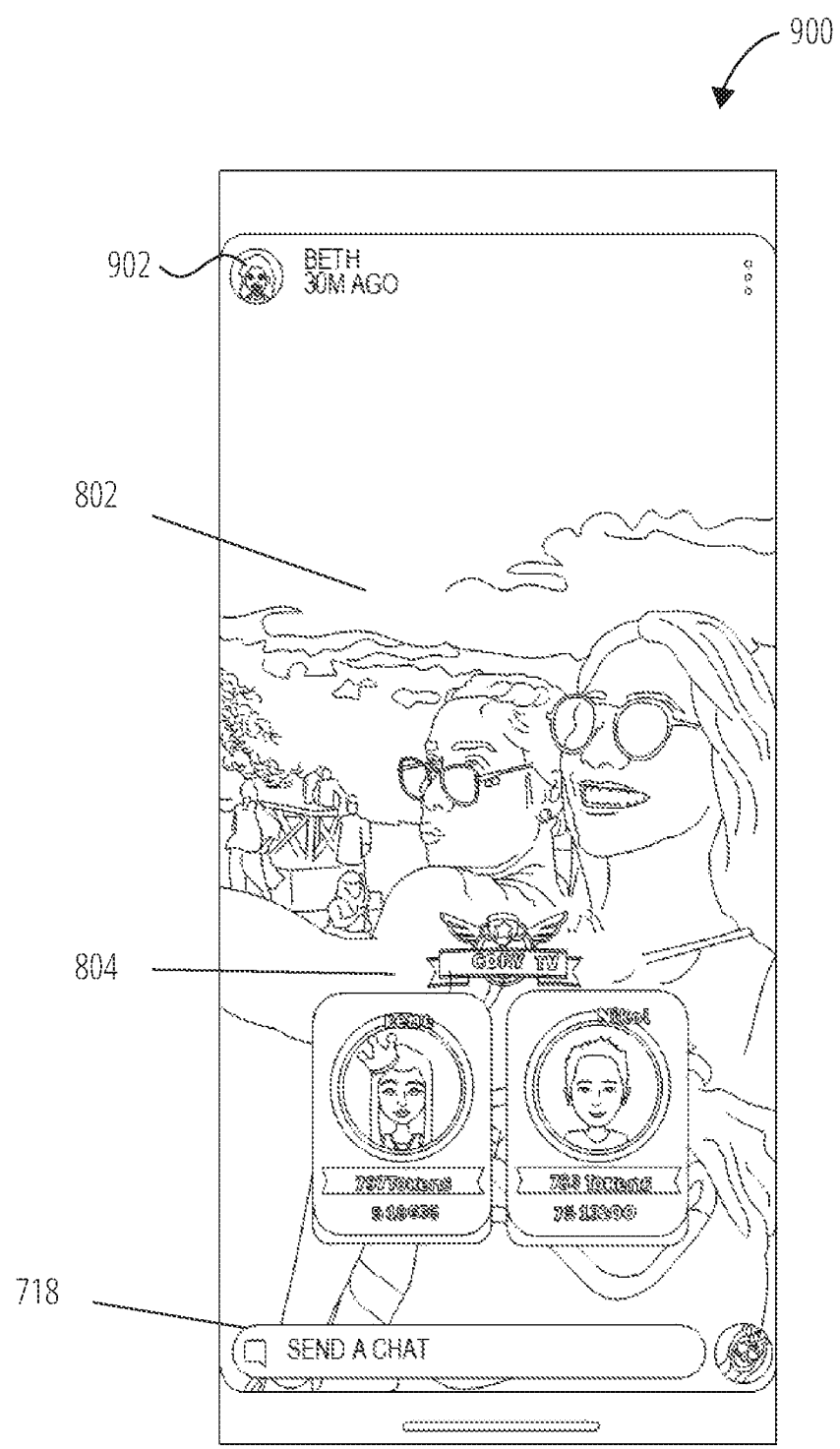
FIG. 9 is a user interface diagram illustrating an example user interface of a game result overlay thumbnail overlaid on top of a media content item in accordance with some examples.

FIG. 9 is a user interface diagram illustrating an example user interface 1000 of a game result overlay thumbnail 902 overlaid on top of a media content item in accordance with some examples. As shown in FIG. 9, the media content item 702 (e.g., a content collection with digital photographs, or videos) includes the chat messaging interface 618.

As the client device 102 creates the content collection, transmits the content collection, receives the content collection or communicates with other users in the social network via the chat messaging interface 618, the client device 102 generates a game result overlay thumbnail 902 by identifying and retrieving game play information, including a set of graphical elements and objects associated within the set of graphical objects shown in FIG. 7. Image processing, including optical identification scanning functions, is utilized in identifying the set of graphical elements by scanning the game play session and associated graphical objects and capturing the graphical elements that are embedded, formatted, displayed, or hidden within the gaming application gaming environment and the graphical object.

In some examples, the game result overlay thumbnail 902 is generated from the identified game result overlay 704, avatar graphical object of the first user 608, avatar graphical object of the second user 610, gaming results graphical element of the first user 612, and the gaming result graphical element of the second user 606. After the game result overlay thumbnail 902 is rendered and overlaid on top of a content collection or media content item 702, by applying a user gesture (e.g., finger press) the user of the computing device is taken to the gaming application associated with the game result overlay thumbnail 902, which in this case is titled "CORY TV" gaming application.

Figure 10:
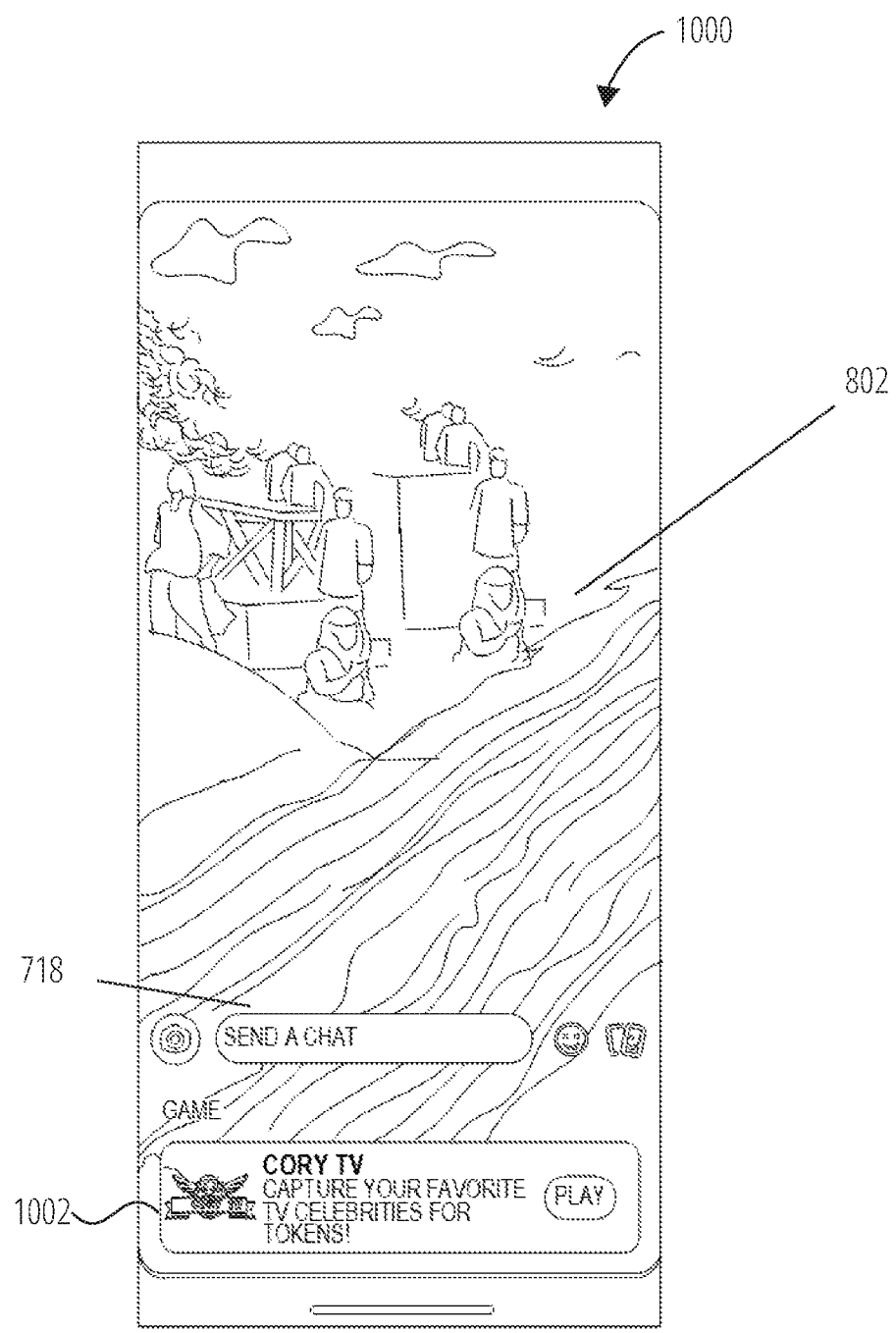
FIG. 10 is a flowchart illustrating a method for generating a game result overlay in accordance with some examples.

FIG. 10 is a flowchart illustrating a method 1000 for generating a game result overlay in accordance with some examples. While certain operations of the method 1000 are described as being performed by certain devices, in different examples different devices or a combination of devices may perform these operations. For example, operations described below as being performed by the client device 102 may also be performed by or in combination with server-side computing device (e.g., the messaging server system 108), or third-party server computing device.

The method 1000 commences with operation 1002, during which the client device 102, and more specifically an application executing on the client device 102 (e.g., the messaging client 104 or a gaming application), presents the game result indicium 614 within the gaming interface 600 illustrated in FIG. 6.

In some examples, the game result indicium 614 is displayed within the gaming interface 600 as presented by the messaging client 105, a gaming application launched by the client device 102, or a game applet executing as part of the messaging client 105. For the purposes of the example described with reference to FIG. 6, it is assumed that the gaming interface 600 is presented by a gaming application executing on the client device 102, the gaming application either being integrated with the messaging client 104 or being a standalone application that communicates with the messaging client 104.

The game result indicium 614 may include a variety of graphical objects and elements, which include augmented reality images, segments, graphical objects, graphical elements, avatars, filters, 2D or 3D alpha-numeric characters, 2D or 3D animation, icons, alpha-number character and character strings from the gaming environment of the gaming application, virtual environment, or 2D/3D computing environment.

In other examples, the gaming application includes a game play session which is launched based on communicating with the game system 210, another client device, or a third-party server. The game result launch indicia 616 are displayed during the game play session, as shown in FIG. 6, and correspond to interactive buttons, icons, or graphical control elements that enable the user of the client device 102 to activate or trigger a tasks or event, such as generating a game result overlay or starting a new gaming application or game play session. In some examples, game result indicium 614 are two or more game result indicium that are enabled to trigger an event associated with the present disclosure, which include but are not limited to, activating a new game, generating a game result overlay 704, generating game result overlay thumbnail 902 or exiting the gaming application and game play session.

In operation 1004, the client device 102 retrieves the game play information related to the game play session responsive to a user-selection of the game result indicium. In some examples, game play information is retrieved from local storage on the client device 102, the database 120, game system 210, a third-party server, or a combination of the aforementioned. Game play information is also based on game play characteristics, events or results (e.g., player score, results, commentary, etc.,) associated with the users engaged in the game play session. In other examples, game play information can be captured or retrieved by image processing techniques, including optical identification scanning functions, by scanning the game play session and associated graphical objects, and capturing the graphical elements that are embedded, formatted, displayed, or hidden within the gaming application gaming environment.

In some examples, the game play information includes graphical objects corresponding to a title icon, an avatar representing the first user, an avatar representing the second user, a three-dimensional object, an animation associated with a gaming preference of the gaming application, a username of the first user, a username of the second user, a gaming result associated with the first user, and a gaming result associated with the second user. The game play session can be a collaborative gaming application, a non-collaborative gaming application, or a customized media application In other examples, the client device 102 captures the game play information based on computer graphic characteristics, such as metadata associated with the graphical objects (as illustrated on FIG. 6, e.g., gaming result graphical element of the second user 606 and gaming results graphical element of the first user 612), a location in which the graphical elements and objects are situated in the gaming environment of the game play session, the memory size, category, and type game play information. Game play information also includes usernames associated with the user of the gaming application, gaming results associated with the users of the gaming application, gaming application title icons and 2D/3D animations, or avatars associated with the users of the gaming application. The client device 102 can be in communication with the game system 210 and augmentation table 310 to determine additional augmented characteristics associated with the game play information.

In operation 1006, client device 102 generates the game result overlay based on game play information generated during the game play session. In some examples, the game result overlay is an object, image, animation, three-dimensional object, digital picture, emoji, augmented reality image, augmented reality transformation or digital character icon that is overlaid on top of a media content item or content collection that has been created, or is in the process of being created by the user of the computing device. As users interact during the game play session, game play information, such as player scores, player achievements, player prizes and tokens are generated, recorded, and accumulated. Other game play information generated during game play sessions are avatars, icons, and other graphical objects related to the game play session.

In some examples, the client device 102 generates an augmented reality image transformation overlay or the game result overlay thumbnail 902 based on the game play information. The augmented reality image transformation overlay generated based on the captured identified graphical elements and rendered as augmented reality content items, overlays, image transformations, AR images, and similar modifications that are applied to media content item (e.g., videos or images). The game result overlay thumbnail 902 is a reduced sized version of the gaming application or game play session that is overlaid on top of the media content item, content collection, or chat interface. The media content item includes at least one video, at least one image, at least one digital photograph, at least one augmented reality media content item, or at least one three-dimensional object. In some examples, when a user applies a user gesture on the game result overlay thumbnail 902, the game play session (or media application) is activated.

Upon generation of the game result overlay 704, in operation 1008, the client device 102 presenting the game play overlay overlaid on a media content item to generate a composite media content item. In some examples, the client device 102 arranges and generates the game play information into a single entity structure, such as a composite media content item. In some examples, the composite media content item 804 is a single digital entity, such as a merged digital photograph content item. The client device 102 can also retrieve augmentation data, such as overlays or filters, from the augmentation table 310 in order to incorporate additional image characteristics to the composite media content item 804, the game result overlay, or the augmented reality image transformation overlay. The augmentation data is associated with and applied to videos (for which data is stored in a video table 314) and images (for which data is stored in an image table 316).

In operation 1010, the client device 102 transmits the composite media content item 804 to a second user. In some examples, the composite media content item 804 is transmitted or shared, between one or more users in the social network of the messaging application in a chat interface, during a chat messaging session, after a chat messaging session, during active gaming application participation one or more users of the computing devices, or after creating a content collection.

Machine Architecture

Figure 11:
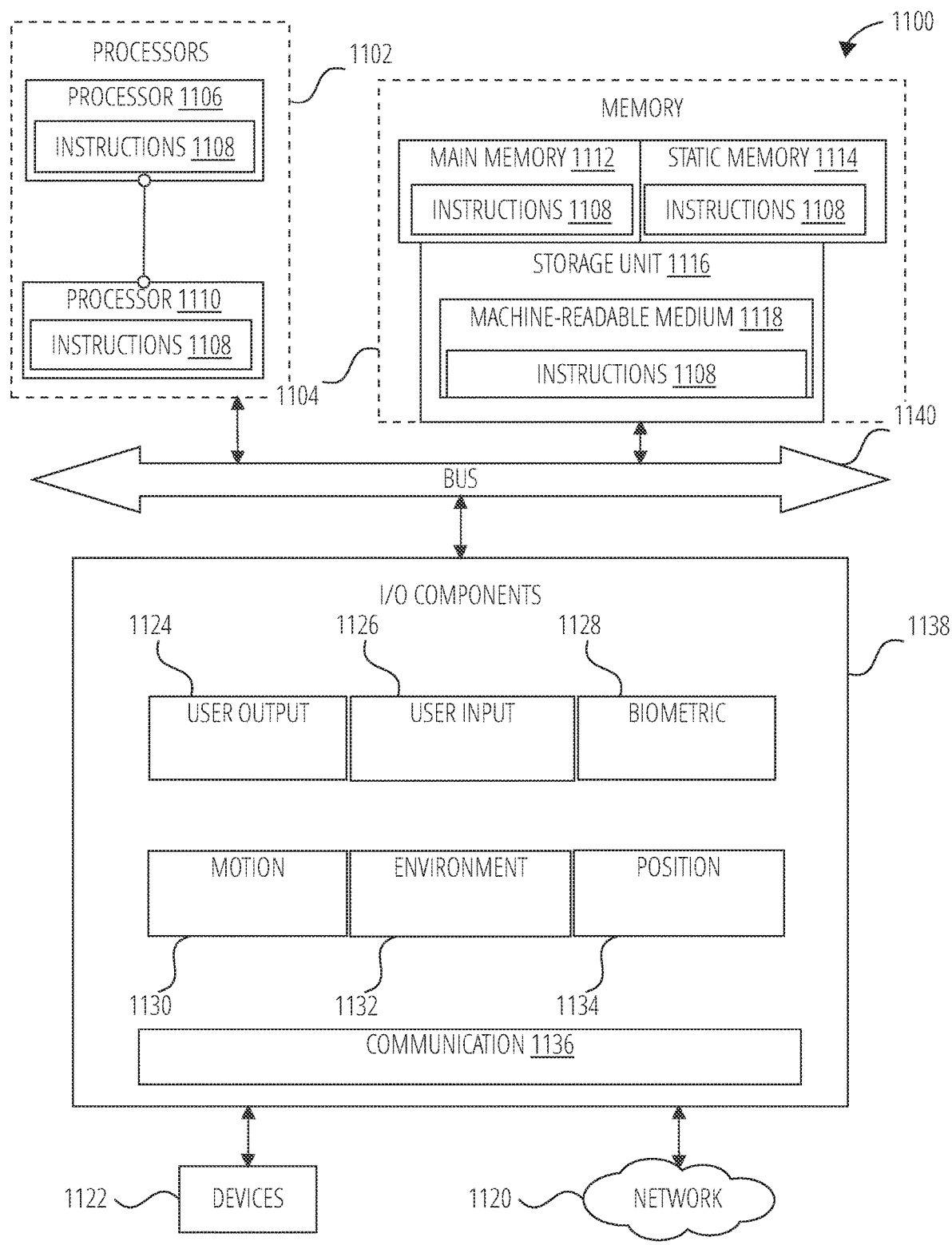
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output I/O components 638, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1140. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the Processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface Component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
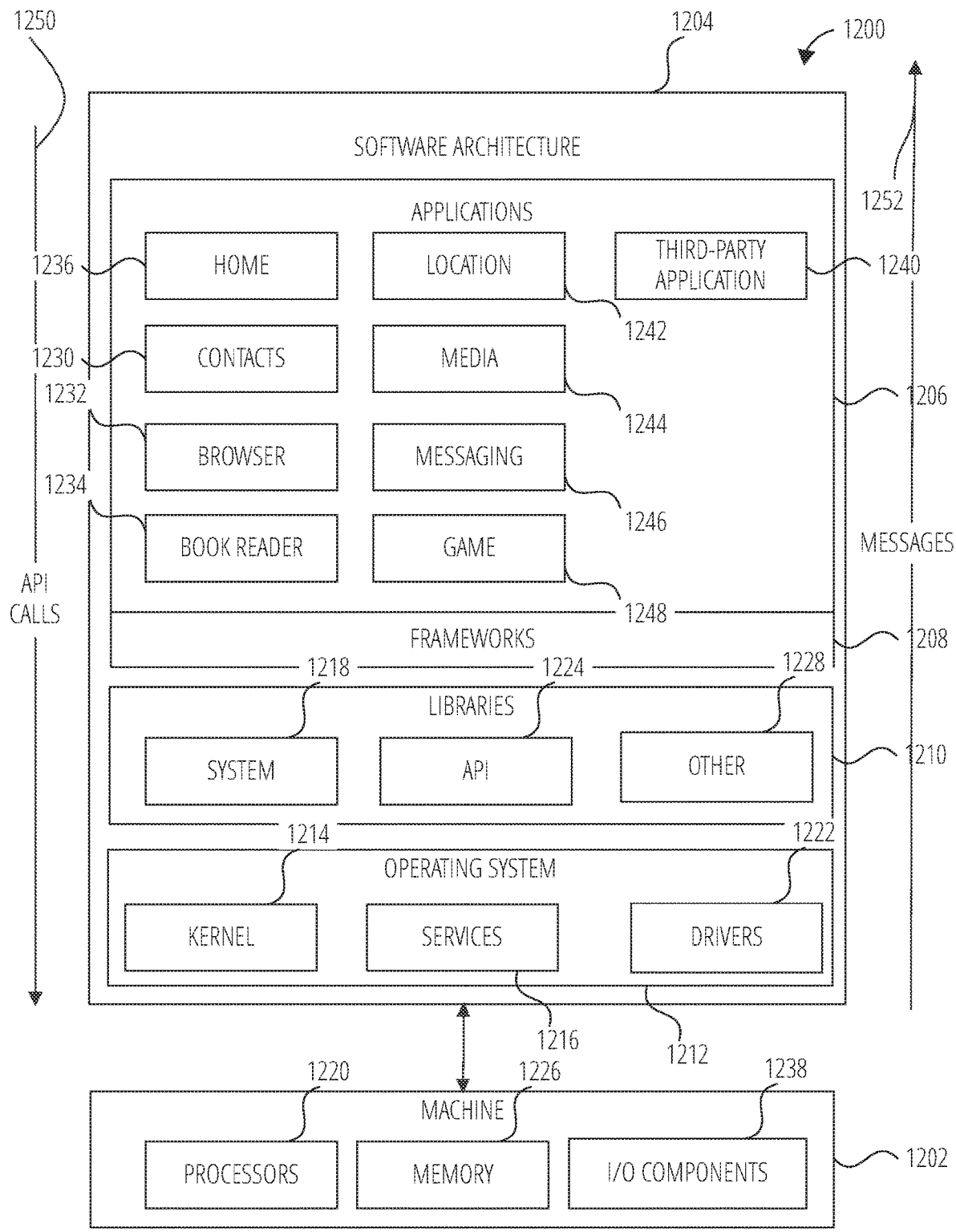
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOST™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Processing Components

Figure 13:
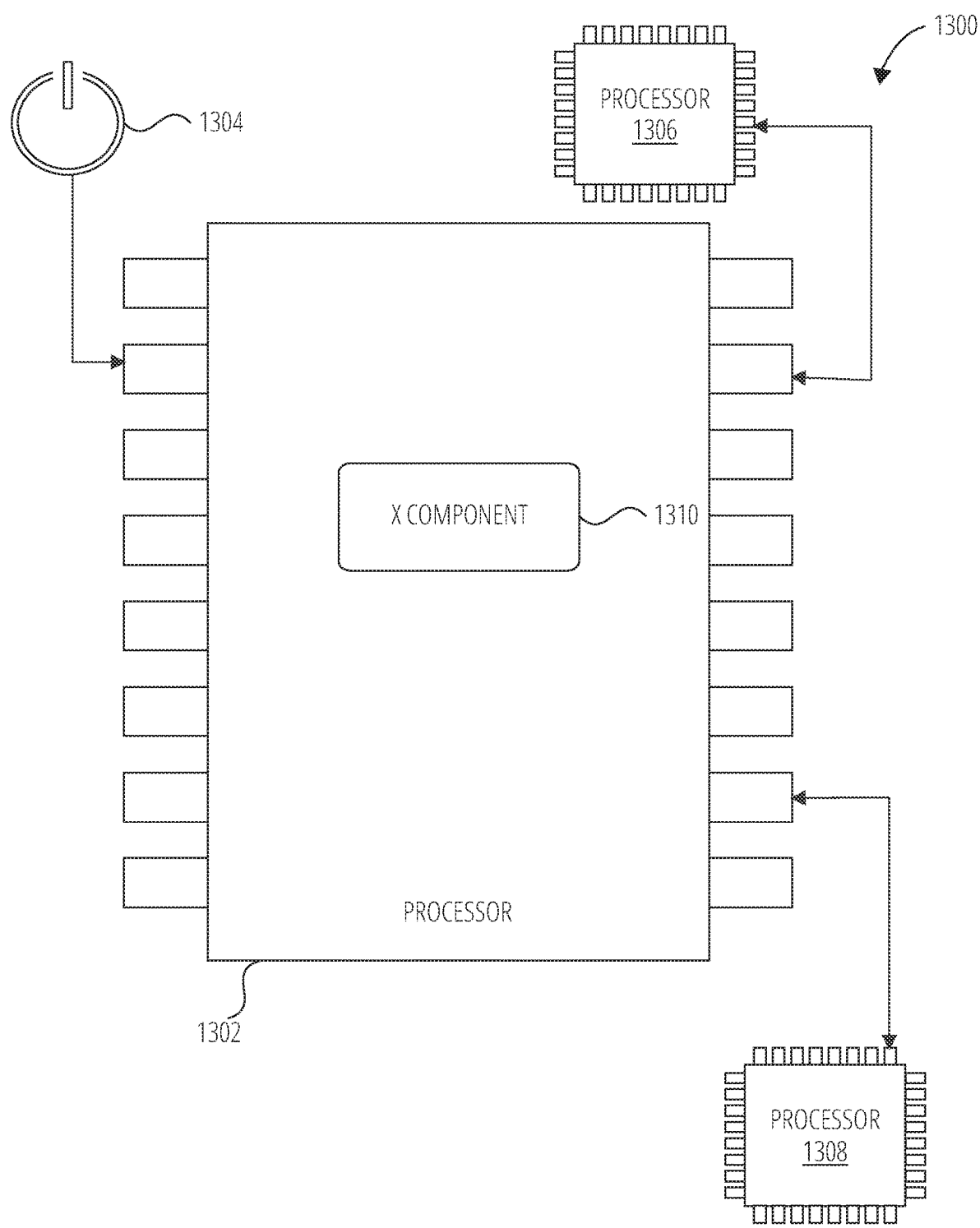
FIG. 13 is a diagrammatic representation of a processing environment, in accordance with some examples.

Turning now to FIG. 13, there is shown a diagrammatic representation of a processing environment 1300, which includes a processor 1302, a processor 1306, and a processor 1308 (e.g., a GPU, CPU or combination thereof).

The processor 1302 is shown to be coupled to a power source 1304, and to include (either permanently configured or temporarily instantiated) modules, namely a Game result overlay component 1310. The Game result overlay component 1310 operationally presents a game result indicium, retrieves game play information related to a game play session, generates a game result overlay based on the game play information generated during the game play session, presents the game play overlay overlaid on a media content item to generate a composite media content item, and transmit the composite media item to a second user. While not shown, the processor 1106 can alternatively include the timeline content collection component 1110 that performs the operations of the timeline content collection system 212. As illustrated, the processor 1102 is communicatively coupled to both the processor 1106 and the processor 1108.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   detecting, by one or more processors, an end of a game play session;
   causing, by one or more processors, a game result indicium to be presented in a user interface of a gaming application, wherein the game result indicium includes a graphical element that is selectable to activate or trigger a task or event;
   responsive to a first user-selection of the game result indicium, scanning, by the one or more processors, information generated during the game play session to identify game play information that includes an avatar associated with a first user, a gaming result of the game play session, and a graphical title icon related to the game play session;
   generating, by the one or more processors, a game result overlay comprising the game play information;
   generating, by the one or more processors, a content collection that includes a media content item captured by a camera of a computing device of the first user, the camera including one or more sensors integrated with the computing device of the first user;
   generating, by the one or more processors, a composite media content item that includes the game result overlay displayed over the media content item; and
   causing by the one or more processors, the composite media content item to be transmitted to a second user.

2. The method of claim 1, further comprising:
   causing, by the one or more processors, a content collection creation user interface of a social networking application to be presented in response to selection of the game result indicium, the content collection creation user interface including the media content item and the game result overlay.

3. The method of claim 1, wherein the game play information being at least one of a group comprising, the avatar representing the first user, an avatar representing the second user, a three-dimensional object, an animation associated with a gaming preference of the gaming application, a username of the first user, a username of the second user, a gaming result associated with the first user, and a gaming result associated with the second user.

4. The method of claim 1, wherein the gaming application is at least one of a group including a collaborative gaming application, a non-collaborative gaming application, and a customized media application.

5. The method of claim 3, further comprising:
generating, by the one or more processors, an augmented reality image transformation overlay based on the game play information.

6. The method of claim 1, wherein the game result indicium comprises at least one of a group comprising an icon, an interactive button, and a selection window.

7. The method of claim 6, further comprising:
presenting, by the one or more processors, the game result indicium; and
responsive to a second user-selection of the game result indicium, launching a second game play session.

8. The method of claim 1, comprising:
generating, by the one or more processors, a game result overlay thumbnail based on the game result overlay;
causing, by the one or more processors, the game result overlay thumbnail to be displayed on top of an additional media content item displayed in a chat interface; and
responsive to detecting, by the one or more processors, selection of the game result overlay thumbnail in response to a user gesture, launching the gaming application.

9. The method of claim 1, wherein transmitting the composite media content item to the second user comprises sending the game result overlay to the second user during a chat messaging session.

10. The method of claim 1, wherein the media content item comprises at least one video, at least one image, at least one digital photograph, at least one augmented reality media content item, or at least one three-dimensional object.

11. A system comprising:
a processor; and
a memory storing instructions that, when executed by the processor, configure the system to performing operations comprising:
detecting an end of a game play session;
causing a game result indicium to be presented in a user interface of a gaming application, wherein the game result indicium includes a graphical element that is selectable to activate or trigger a task or event;
responsive to a first user-selection of the game result indicium, scanning information generated during the game play session to identify game play information that includes an avatar associated with a first user, a gaming result of the game play session, and a graphical title icon related to the game play session;
generating a game result overlay comprising the game play information;
generating a content collection that includes a media content item captured by a camera of a computing device of the first user, the camera including one or more sensors integrated with the computing device of the first user;
generating a composite media content item that includes the game result overlay displayed over the media content item; and
causing the composite media content item to be transmitted to a second user.

12. The system of claim 11, wherein the instructions configure the system to perform operations comprising:
causing a content collection creation user interface of a social networking application to be presented in response to selection of the game result indicium, the content collection creation user interface including the media content item and the game result overlay.

13. The system of claim 11, wherein the game play information being at least one of a group comprising, the avatar representing the first user, an avatar representing the second user, a three-dimensional object, an animation associated with a gaming preference of the gaming application, a username of the first user, a username of the second user, a gaming result associated with the first user, and a gaming result associated with the second user.

14. The system of claim 11, wherein the gaming application is at least one of a group including a collaborative gaming application, a non-collaborative gaming application, and a customized media application.

15. The system of claim 14, wherein the instructions further configure the system to perform operations comprising:
generating, by the processor, an augmented reality image transformation overlay based on the game play information.

16. The system of claim 11, wherein the game result indicium comprises at least one of a group comprising an icon, an interactive button, and a selection window.

17. The system of claim 11, wherein the instructions further configure the system to perform operations comprising:
presenting, by the processor, the game result indicium; and
responsive to a second user-selection of the game result indicium, launching a second game play session.

18. The system of claim 11, wherein transmitting the composite media content item to the second user comprises sending the game result overlay to the second user during a chat messaging session.

19. A non-transitory computer-readable storage medium, the computer-readable storage medium including instructions that when executed by a computer, cause the computer to perform operations comprising:
detecting an end of a game play session;
causing a game result indicium to be presented in a user interface of a gaming application, wherein the game result indicium includes a graphical element that is selectable to activate or trigger a task or event;
responsive to a first user-selection of the game result indicium, scanning information generated during the game play session to identify game play information that includes an avatar associated with a first user, a gaming result of the game play session, and a graphical title icon related to the game play session;
generating a game result overlay comprising the game play information;
generating a content collection that includes a media content item captured by a camera of a computing device of the first user, the camera including one or more sensors integrated with the computing device of the first user;
generating a composite media content item that includes the game result overlay displayed over the media content item; and
causing the composite media content item to be transmitted to a second user.

20. The non-transitory computer-readable storage medium of claim 19, wherein the game play information being at least one of a group comprising a title icon, the avatar representing the first user, an avatar representing the second user, a three-dimensional object, an animation associated with a gaming preference of the gaming application, a username of the first user, a username of the second user, a gaming result associated with the first user, and a gaming result associated with the second user.

\* \* \* \* \*